(12) United States Patent
Suciu et al.

(10) Patent No.: US 9,920,708 B2
(45) Date of Patent: Mar. 20, 2018

(54) NOSE CONE ASSEMBLY AND METHOD OF CIRCULATING AIR IN A GAS TURBINE ENGINE

(71) Applicant: UNITED TECHNOLOGIES CORPORATION, Farmington, CT (US)

(72) Inventors: Gabriel L. Suciu, Glastonbury, CT (US); Nathan Snape, Tolland, CT (US); Anthony R. Bifulco, Ellington, CT (US); William K. Ackermann, East Hartford, CT (US); Becky E. Rose, Colchester, CT (US); Jesse M. Chandler, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 621 days.

(21) Appl. No.: 14/617,366

(22) Filed: Feb. 9, 2015

(65) Prior Publication Data
US 2018/0045138 A1   Feb. 15, 2018

(51) Int. Cl.
| | |
|---|---|
| F02C 7/04 | (2006.01) |
| F02K 1/04 | (2006.01) |
| F01D 15/08 | (2006.01) |
| F01D 25/14 | (2006.01) |
| F02C 7/057 | (2006.01) |
| F02C 7/18 | (2006.01) |
| F01D 25/12 | (2006.01) |
| F02C 7/14 | (2006.01) |

(52) U.S. Cl.
CPC ............... *F02K 1/04* (2013.01); *F01D 15/08* (2013.01); *F01D 25/125* (2013.01); *F01D 25/14* (2013.01); *F02C 7/057* (2013.01); *F02C 7/14* (2013.01); *F02C 7/185* (2013.01); *F05D 2220/32* (2013.01); *F05D 2260/213* (2013.01)

(58) Field of Classification Search
CPC ...... F02C 7/04; F02C 7/14; F02C 7/18; B64C 11/14; B64C 11/00; B64C 11/02; B64C 21/00; B64C 23/00; B64C 23/02; B64C 23/08; B64C 1/38; F01D 25/12; F05D 2220/32; F05D 2260/213
USPC ........................................ 415/1; 416/93 R, 94
See application file for complete search history.

(56) References Cited

U.S. PATENT DOCUMENTS

| | | | | |
|---|---|---|---|---|
| 2,330,622 | A | * | 9/1943 | Ramshorn ................. F01P 7/02 123/41.65 |
| 2,670,050 | A | * | 2/1954 | Enos ....................... B64C 11/14 416/160 |
| 2,726,725 | A | * | 12/1955 | Nichols ................... B64C 11/14 416/94 |
| 3,228,476 | A | * | 1/1966 | Brown .................... B64C 11/14 416/94 |

(Continued)

OTHER PUBLICATIONS

European Search Report for Application No. EP 16 15 4872.

*Primary Examiner* — Kenneth Bomberg
*Assistant Examiner* — Brian Delrue
(74) *Attorney, Agent, or Firm* — Cantor Colburn

(57) ABSTRACT

A nose cone assembly for a gas turbine engine and method of circulating air in a gas turbine engine are disclosed. The nose cone assembly includes a nose cone having an aperture communicating air to an interior space of the nose cone and a discharge member communicating the air out of the nose cone.

19 Claims, 5 Drawing Sheets

(56) References Cited

U.S. PATENT DOCUMENTS

| | | | | |
|---|---|---|---|---|
| 4,171,183 A * | 10/1979 | Cornell | ................... | B64C 11/00 |
| | | | | 416/223 R |
| 4,722,666 A | 2/1988 | Dennison et al. | | |
| 4,999,994 A | 3/1991 | Rued et al. | | |
| 5,833,435 A | 11/1998 | Smith | | |
| 7,559,191 B2 * | 7/2009 | Parks | ................... | B64C 11/001 |
| | | | | 416/245 R |
| 8,221,080 B2 * | 7/2012 | Clemen | ................... | B64C 11/14 |
| | | | | 416/94 |
| 9,062,566 B2 * | 6/2015 | Suciu | ..................... | F01D 25/12 |
| 2007/0056291 A1 * | 3/2007 | Koenig | ................... | B64C 11/02 |
| | | | | 60/784 |
| 2009/0060748 A1 * | 3/2009 | Landa | .................... | F03D 80/60 |
| | | | | 416/93 R |
| 2011/0206508 A1 * | 8/2011 | Soucheleau | ............ | B64C 11/40 |
| | | | | 416/1 |
| 2013/0259638 A1 | 10/2013 | Suciu | | |
| 2013/0259639 A1 | 10/2013 | Suciu et al. | | |
| 2013/0259687 A1 * | 10/2013 | Suciu | .................... | F01D 25/12 |
| | | | | 416/1 |
| 2015/0315922 A1 * | 11/2015 | Roach | ....................... | F02C 7/04 |
| | | | | 416/93 R |
| 2016/0281721 A1 * | 9/2016 | Army, Jr. | ................ | F04D 17/16 |

\* cited by examiner

NOSE CONE ASSEMBLY AND METHOD OF CIRCULATING AIR IN A GAS TURBINE ENGINE

TECHNICAL FIELD OF THE DISCLOSED EMBODIMENTS

The present disclosure is generally related to turbine engines, in particular to a nose cone assembly and a method of circulating air in a gas turbine engine.

BACKGROUND OF THE DISCLOSED EMBODIMENTS

Gas turbine engines include bearing assemblies to support the rotating shafts of the engine. During operation, the bearing assemblies experience high thermal loads that may be controlled with a thermal management system. A thermal management system utilizes a heat exchanger to cool fluids such as oil flowing to and from bearing assemblies or other engine components. A thermal management system enhances durability and provides efficient operation of bearing assemblies and other engine components. However, thermal management systems often include a complex network of airflow circulation pathways and fluid lines to effectively cool the high temperature fluid. In some gas turbine engines, incorporation of a thermal management system is challenging.

Therefore, a need exists in the art for a thermal management system for a gas turbine engine having enhanced efficiency and applicability.

SUMMARY OF THE DISCLOSED EMBODIMENTS

In an embodiment, a nose cone assembly for a gas turbine engine is disclosed comprising a nose cone having an aperture communicating air to an interior space of the nose cone, a discharge member communicating the air out of the nose cone, and a heat exchanger disposed forward of the discharge member in the interior space. In a further embodiment of the above, the discharge member discharges the air at a discharge location forward of a fan of the gas turbine engine when the nose cone assembly is mounted to the gas turbine engine. In a further embodiment of any of the above, the discharge location is forward of a fan inlet guide vane of the gas turbine engine when the nose cone assembly is mounted to the gas turbine engine. In a further embodiment of any of the above, the heat exchanger cools fluid circulating through the discharge member. In a further embodiment of any of the above, the discharge member includes a pump that draws air out of the interior space. In a further embodiment of any of the above, the pump is driven by a shaft of the gas turbine engine when the nose cone assembly is mounted to the gas turbine engine. In a further embodiment of any of the above, the nose cone includes a plurality of circumferentially spaced apertures communicating the air to the interior space of the nose cone.

In another embodiment, a gas turbine engine assembly is disclosed comprising a fan section including a fan, a nose cone having an aperture communicating air to an interior space of the nose cone, and a discharge member communicating the air out of the nose cone at a discharge location forward of the fan when the nose cone assembly is mounted to the gas turbine engine. In a further embodiment of any of the above, the gas turbine engine assembly further comprises a heat exchanger disposed forward of the discharge member in the interior space. In a further embodiment of any of the above, the heat exchanger cools fluid circulating through the discharge member. In a further embodiment of any of the above, the fan section further includes a fan inlet guide vane, the discharge location being forward of the fan inlet guide vane when the nose cone assembly is mounted to the gas turbine engine. In a further embodiment of any of the above, the discharge member includes a pump that draws air out of the interior space. In a further embodiment of any of the above, the pump is driven by a shaft of the gas turbine engine. In a further embodiment of any of the above, the nose cone includes a plurality of circumferentially spaced apertures communicating the air to the interior space of the nose cone.

In another embodiment, a method of circulating air in a gas turbine engine is disclosed comprising providing a nose cone having an aperture and an interior space, providing a heat exchanger in the interior space, providing a discharge member, circulating air through the aperture, circulating the air through the heat exchanger in the interior space, and discharging the air out of the discharge member. In a further embodiment of any of the above, discharging the air comprises discharging the air at a discharge location forward of a fan of the gas turbine engine when the nose cone assembly is mounted to the gas turbine engine. In a further embodiment of any of the above, discharging the air comprises discharging the air at a discharge location forward of a fan inlet guide vane of the gas turbine engine. In a further embodiment of any of the above, the method further comprises circulating oil through the heat exchanger and the discharge member. In a further embodiment of any of the above, the method further comprises circulating air through the aperture and the heat exchanger with a pump. In a further embodiment of any of the above, the method further comprises driving the pump with a shaft of the gas turbine engine.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
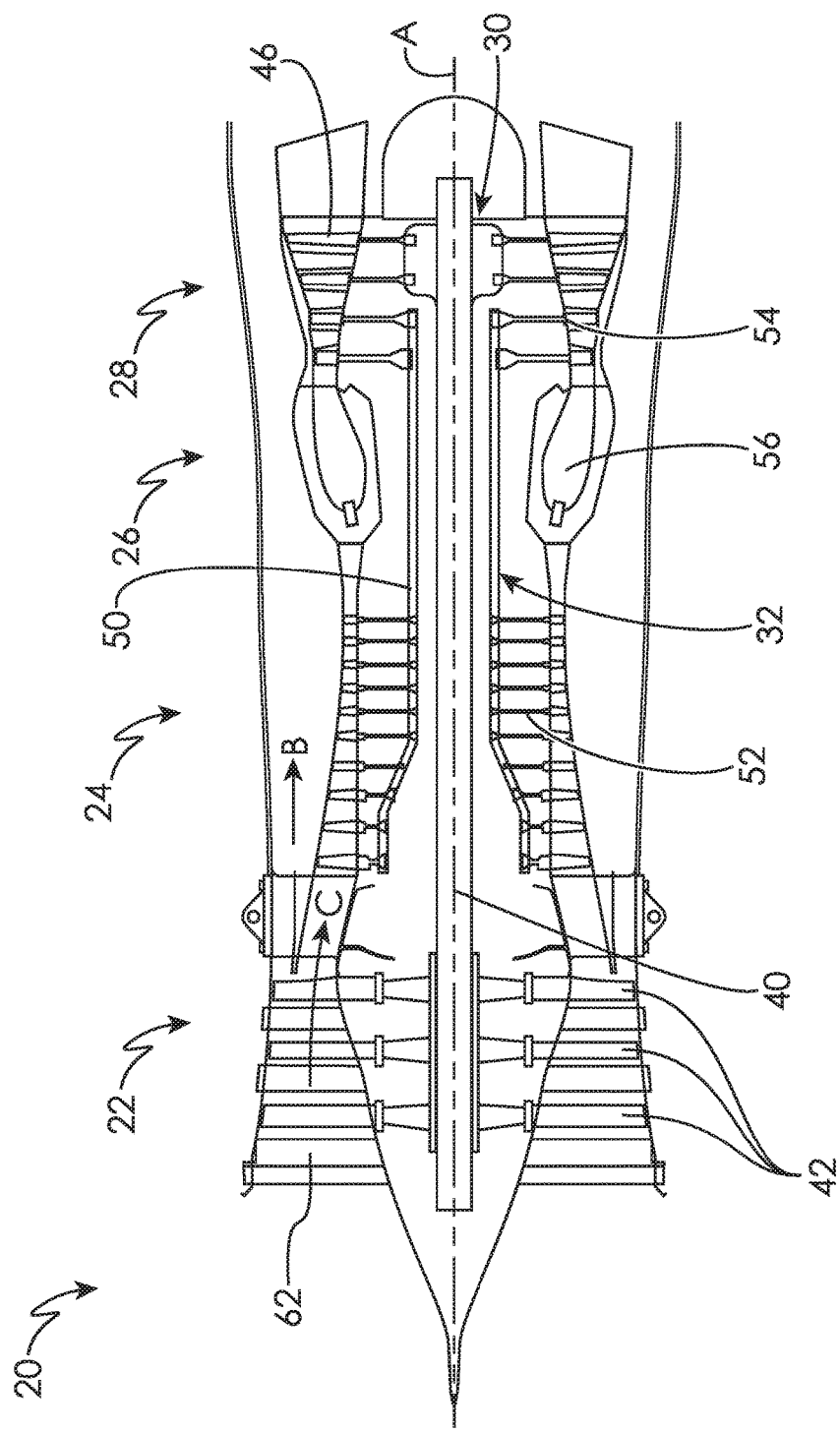
FIG. 1 is a sectional view of one example of a gas turbine engine in which the presently disclosed embodiments may be used.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure via several bearing systems (not shown). It should be understood that various bearing systems at various locations may alternatively or additionally be provided, and the location of bearing systems may be varied as appropriate to the application.

The low speed spool 30 generally includes an inner shaft 40 that interconnects fans 42 and a low pressure turbine 46. The high speed spool 32 includes an outer shaft 50 that interconnects a compressor 52 and a high pressure turbine 54. A combustor 56 is arranged in exemplary gas turbine 20 between the compressor 52 and the high pressure turbine 54. The inner shaft 40 and the outer shaft 50 are concentric and rotate via bearing systems (not shown) about the engine central longitudinal axis A, which is collinear with their longitudinal axes.

The core airflow is compressed by the compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, and turbine section 28 may be varied.

Figure 2:
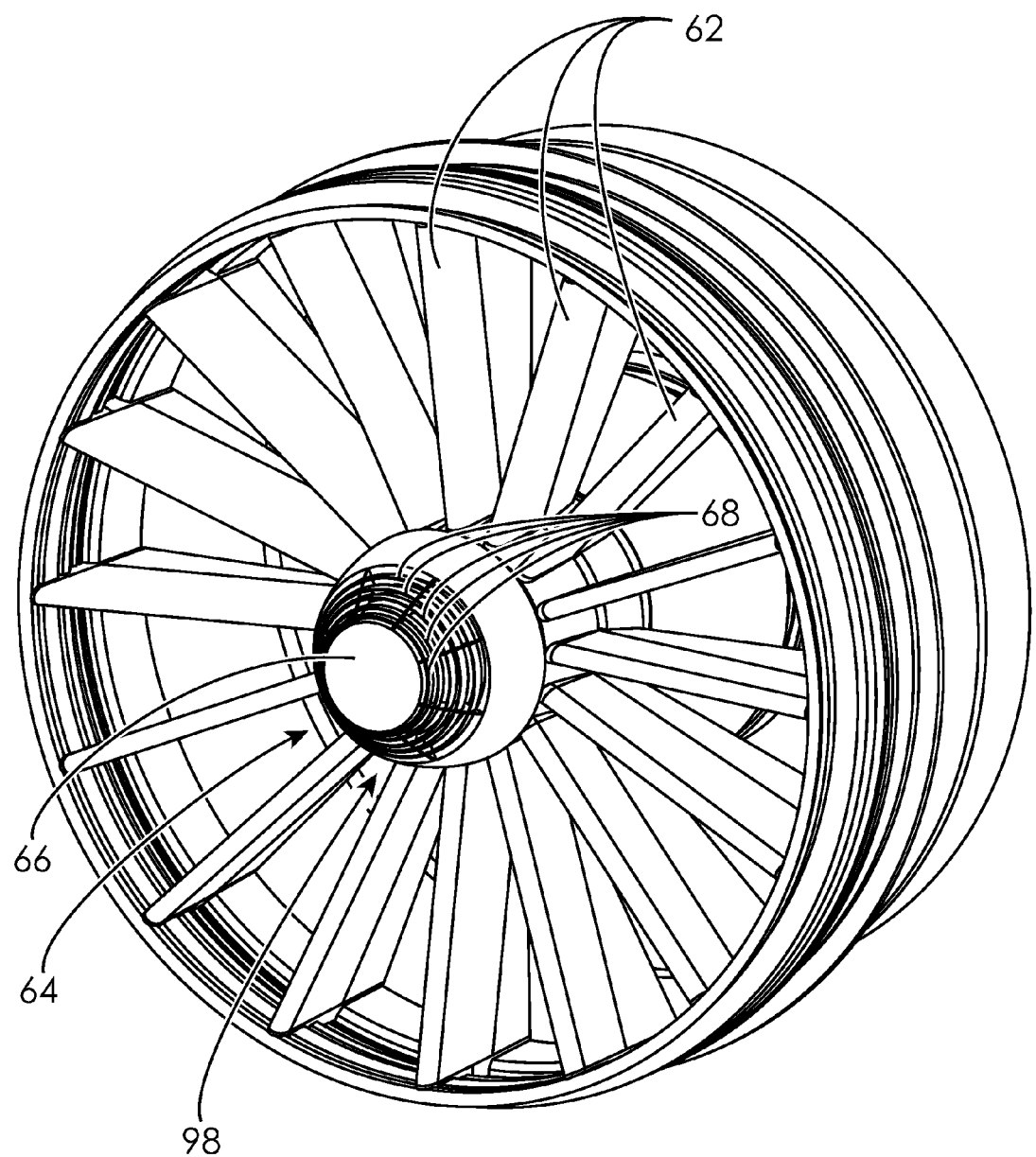
FIG. 2 is a perspective view of a nose cone assembly used in a gas turbine engine in one embodiment.

Referring now to FIG. 2 with continuing reference to FIG. 1, at a position forward of the fans 42, the engine 20 includes a circular array of radially extending fan inlet guide vane (referred to herein as "FIGV 62") 62 in the fan section 22 of the engine 20. Each FIGV 62 is arranged aft of a nose cone assembly 64. The nose cone assembly 64 includes a nose cone 66 having apertures 68, discussed below. As shown in FIG. 2, an array of apertures 68 is provided in a frustoconical pattern in the nose cone 66. The apertures 68 may be circumferentially and axially spaced from each other in a louver pattern as shown. Also shown in FIG. 2, a thermal management system 98 forms part of the nose cone assembly 64 located generally forward of the fans 42 and the FIGV 62.

Figure 3:
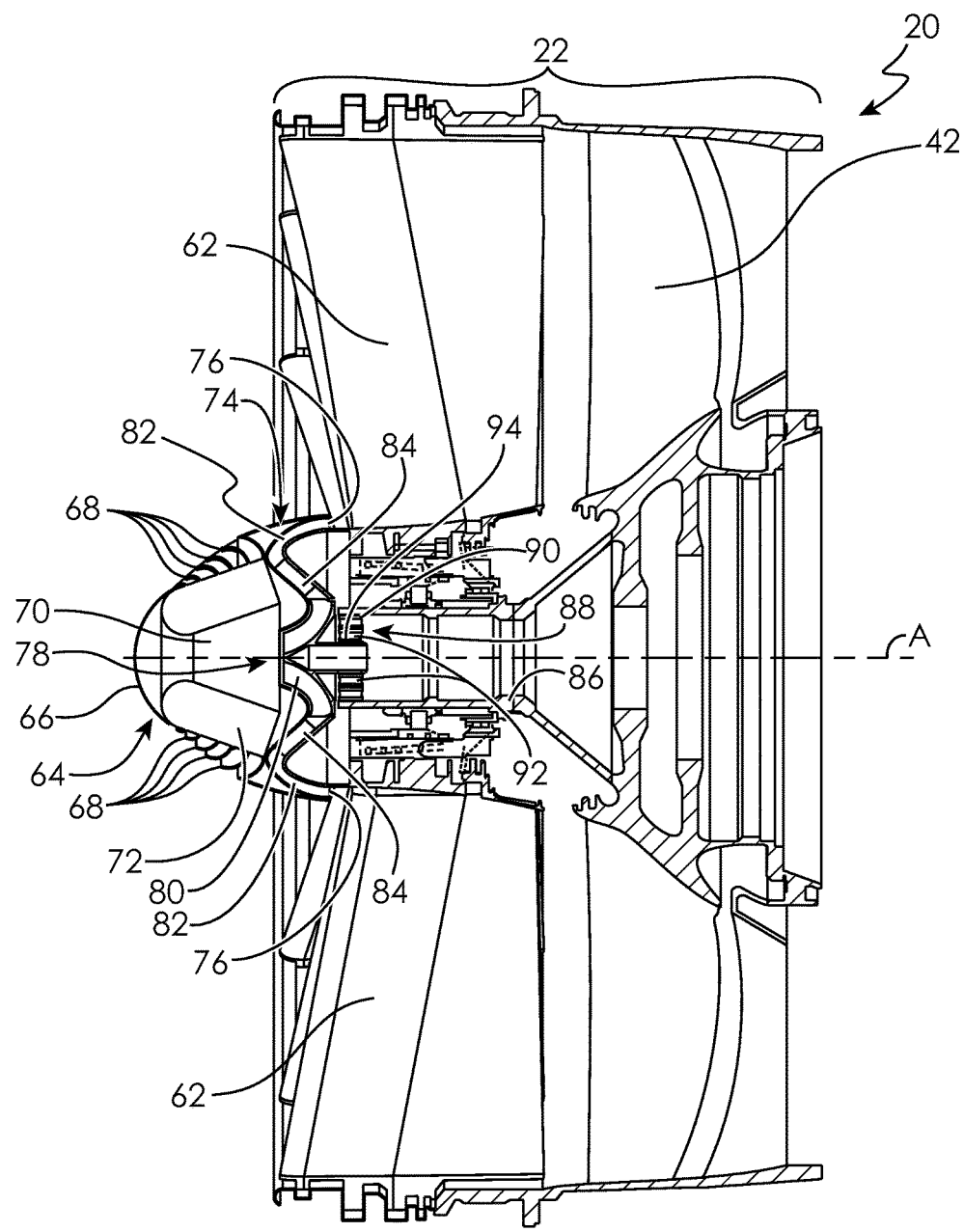
FIG. 3 is a cross sectional view of a nose cone assembly used in a gas turbine engine in one embodiment.

Referring now to FIG. 3, the apertures 68 communicate air into an interior space 70 of the nose cone 66. The apertures 68 shown in FIG. 3 are curved for flow control of air into the interior space 70. A heat exchanger 72 may be generally frustoconical and disposed in the interior space 70, adjacent the apertures 68, to utilize airflow through the apertures 68 for cooling of fluids, as will be explained in more detail below.

A discharge member 74 is positioned aft of the heat exchanger 72 and forward of the fans 42 and/or the FIGV 62. The discharge member 74 is configured to discharge or communicate air out of the nose cone 66 at a discharge location 76 forward of the fans 42 and/or the FIGV 62. The discharge member 74 includes an air pump 78 to draw, drive, or otherwise communicate air into and through the interior space 70.

The pump 78 is a centrifugal pump 78 having a rotor 80 surrounded by a forward-swept discharge casing 82. The discharge casing 82 of the embodiment of FIG. 3 discharges air axially rearward toward a radially inward portion of the fans 42 and/or FIGV 62. The discharge casing 82 includes stator vanes 84 arranged in a circular array around the pump rotor 80 to improve efficiency and reduce swirling of air impinging on the fans 42 and/or FIGV 62 upon discharge. The discharge location 76 includes an annular discharge area at an outer diameter of the nose cone 66.

The pump 78 is axially aligned such that the rotor 80 is configured to rotate about the engine central longitudinal axis A. The pump rotor 80 is driven by either a fan shaft 86 or the inner shaft 40 of the engine 20 shown in FIG. 1.

In the embodiment of FIG. 3, the fan shaft 86 is coupled to the pump rotor 80 through a geared architecture 88. The geared architecture 88 may be an epicyclic gear train, such as a planetary gear system or other gear system, and provides a higher rotational speed for the pump rotor 80 relative to the fan shaft 86. The geared architecture 88 includes a ring gear 90 fixed to the fan shaft 86 and planetary gears 92 surrounding a sun gear 94 fixed to the pump rotor 80. Each planetary gear 92 is rotatably fixed to the discharge member 74 to allow the rotation of the ring gear 90 to ultimately drive the pump rotor 80 through the sun gear 94 at a design speed.

The pump rotor 80 may be driven at any fixed or variable speed relative to the fan shaft 86. Further, the pump 78 or the fan shaft 86 may include a clutch or other engagement mechanism to selectively drive the pump 78 with the fan shaft 86. The pump rotor 80 may be driven by other mechanical energy sources or other types of energy sources, including such non-limiting examples as electrical, hydraulic, or pneumatic energy sources. Each of these non-limiting examples may include variable or fixed speed control mechanisms or a clutch or other engagement mechanism.

Figure 4:
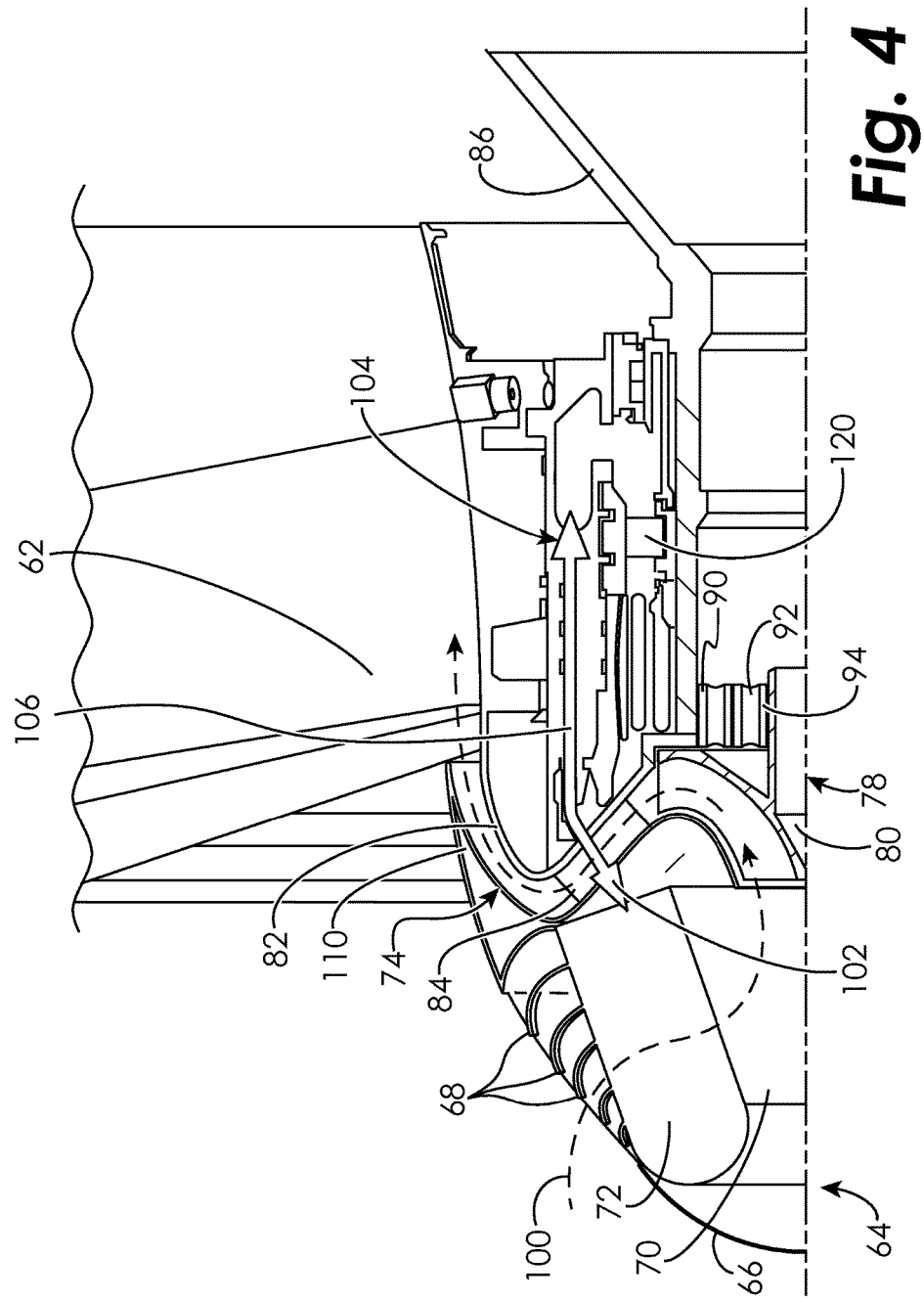
FIG. 4 is a partial cross sectional view of a nose cone assembly used in a gas turbine engine in one embodiment.

Reference is now made to FIG. 4, which illustrates an embodiment of the nose cone assembly 64 and a method of circulating air through the nose cone assembly 64. Freestream air forms airflow 100 and initially circulates radially inward through the one or more apertures 68 before circulating radially inward through the heat exchanger 72 in the interior space 70 of the nose cone 66. The airflow 100 is then drawn axially rearward toward the discharge member 74 by the pump rotor 80 of the pump 78. The pump 78 compels, drives, or otherwise circulates the airflow 100 radially outward through the discharge casing 82. As described previously, the pump 78 illustrated in FIG. 4 is driven by the fan shaft 86 of the engine 20. The airflow 100 circulates axially forward within the discharge casing 82 while passing the stator vanes 84. Finally, the airflow 100 is discharged out of the discharge member 74 in an axially rearward direction at the discharge location 76 forward of the fan 42 and/or FIGV 62.

As shown in FIG. 4, the heat exchanger 72 cools fluid 102 by allowing the airflow 100 to impinge on the heat exchanger 72 and capture thermal energy present in the fluid 102. The heat exchanger 72 of FIG. 4 is an air-oil cooler that circulates oil, lubricant, or other fluid 102 to and from a front bearing compartment 104 via one or more fluid lines 106. The front bearing compartment 104 includes one or more bearings 120 that experience high thermal loads while supporting a forward portion of the fan shaft 86. The heat exchanger 72 can be a fin and tube type heat exchanger and may have a surface area of approximately 100 square inches. Different types and sizes of heat exchangers may be used. The fluid lines 106 of FIG. 4 are disposed in one or more of the stator vanes 84 such that the fluid 102 circulates through the stator vanes 84.

Figure 5:
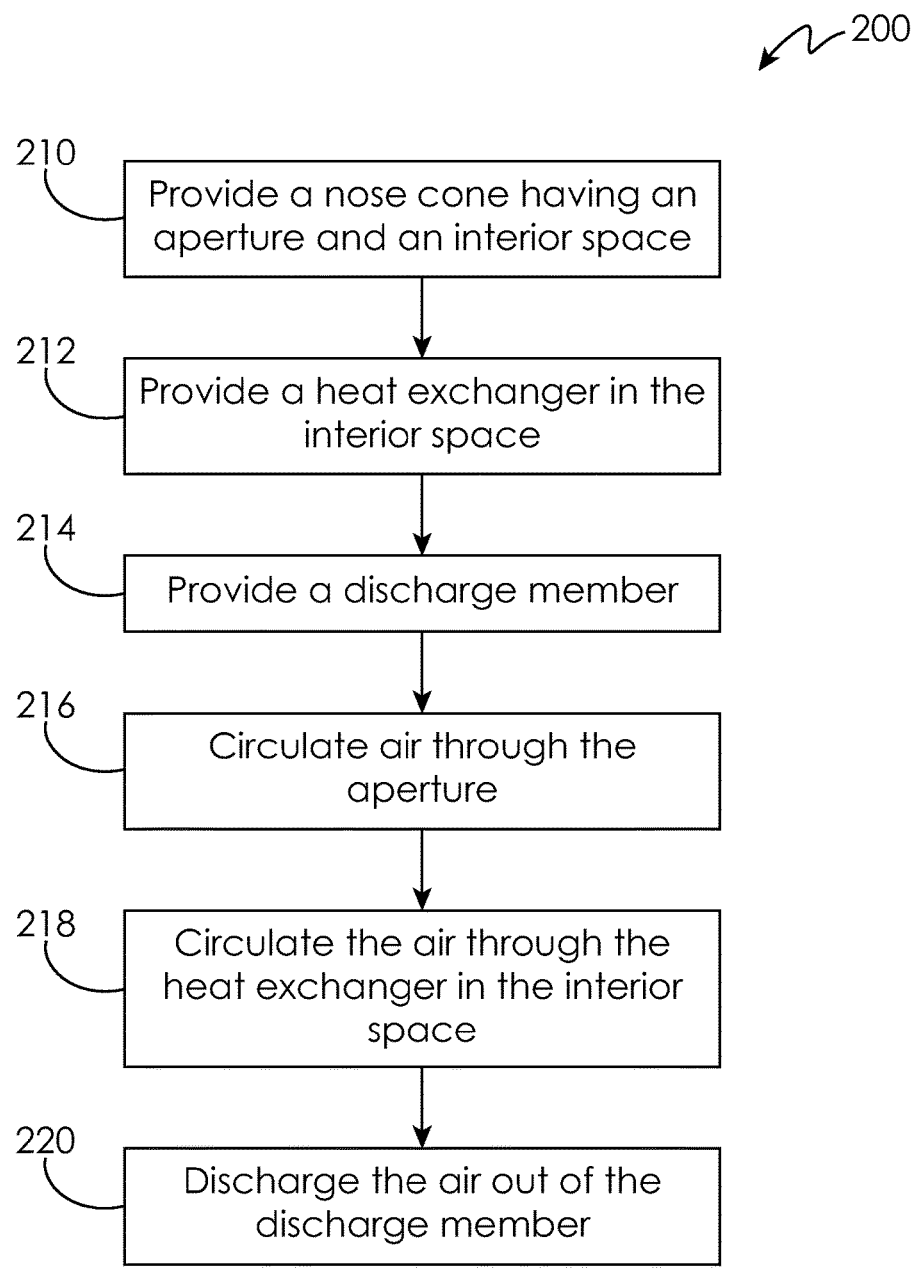
FIG. 5 illustrates a method of circulating air in a gas turbine engine in one embodiment.

Referring now to FIG. 5 with continuing reference to FIG. 4, a method 200 of the present disclosure includes providing, at step 210, the nose cone 66 having apertures 68 and the interior space 70, providing, at step 212, the heat exchanger 72 in the interior space 70, and providing, at step 214, the discharge member 74. The method 200 further includes circulating, at step 216, air through the apertures 68, circulating, at step 218, the air through the heat exchanger 72 in the interior space 70, and discharging, at step 220, the air out of the discharge member 74. The method 200 further includes circulating fluid 102, such as oil for the front bearing compartment 104, through the heat exchanger 72 and the stator vanes 84 of the discharge member 74. As shown by the airflow 100 circulating through both the heat exchanger 72 and the discharge member 74, the fluid 102 is cooled at multiple stages by releasing thermal energy at the heat exchanger 74 and releasing additional thermal energy as the airflow 100 impinges on the stator vanes 84 containing the fluid lines 106.

The airflow 100 circulating through and out of the discharge member 74 has a higher temperature than the initial free-stream air entering the one or more apertures 68 as a result of capturing thermal energy from the fluid 102. The higher temperature airflow 100 transmits thermal energy to an outer surface 110 of the nose cone 66, a radially inner portion of the fan 42, as shown in FIG. 1, and/or a radially inner portion of the FIGV 62 to limit ice formation on those components without the need for additional fan bleed consumption. The nose cone assembly 64 releases the airflow 100 upstream of the fans 42 and/or the FIGV 62 such that the airflow 100 is supplied to the engine through the bypass flow path B or the core flow path C, as referenced in FIG. 1. Additionally, the nose cone assembly 64 is relatively compact and self-contained to allow direct part substitution with nose cone assemblies of gas turbine engines that may benefit from a thermal management system.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A nose cone assembly for a gas turbine engine comprising:
    a nose cone defining an interior space, the nose cone having an array of apertures in a frustoconical pattern in the nose cone and communicating air to the interior space of the nose cone, wherein the array of apertures comprises a plurality of apertures that are axially spaced from each other along the nose cone;
    a discharge member communicating the air out of the nose cone; and
    a frustoconical shaped heat exchanger within the interior space of the nose cone and disposed forward of the discharge member in the interior space.

2. The assembly of claim 1, wherein the discharge member is arranged to discharge the air at a discharge location forward of a fan of a gas turbine engine when the nose cone assembly is mounted to the gas turbine engine.

3. The assembly of claim 2, wherein the discharge location is forward of a fan inlet guide vane of the gas turbine engine when the nose cone assembly is mounted to the gas turbine engine.

4. The assembly of claim 1, wherein the heat exchanger cools fluid circulating through the discharge member.

5. The assembly of claim 1, wherein the discharge member includes a pump that draws air out of the interior space.

6. The assembly of claim 5, wherein the pump is driven by a shaft of the gas turbine engine when the nose cone assembly is mounted to the gas turbine engine.

7. The assembly of claim 1, wherein the plurality of apertures of the array of apertures are circumferentially spaced about the nose cone and communicate the air to the interior space of the nose cone.

8. A gas turbine engine assembly comprising:
    a fan section including a fan;
    a nose cone defining an interior space, the nose cone having an array of apertures in a frustoconical pattern in the nose cone and communicating air to the interior space of the nose cone, wherein the array of apertures comprises a plurality of apertures that are axially spaced from each other along the nose cone;
    a discharge member communicating the air out of the nose cone at a discharge location forward of the fan when the nose cone assembly is mounted to the gas turbine engine; and
    a frustoconical shaped heat exchanger within the interior space of the nose cone and disposed forward of the discharge member in the interior space.

9. The assembly of claim 8, wherein the heat exchanger cools fluid circulating through the discharge member.

10. The assembly of claim 8, wherein the fan section further includes a fan inlet guide vane, the discharge location being forward of the fan inlet guide vane when the nose cone assembly is mounted to the gas turbine engine.

11. The assembly of claim 8, wherein the discharge member includes a pump that draws air out of the interior space.

12. The assembly of claim 11, wherein the pump is driven by a shaft of the gas turbine engine.

13. The assembly of claim 8, wherein the plurality of apertures of the array of apertures are circumferentially spaced about the nose cone and communicate the air to the interior space of the nose cone.

14. A method of circulating air in a gas turbine engine comprising:
    providing a nose cone defining an interior space, the nose cone having an array of apertures in a frustoconical pattern in the nose cone and communicating air to the interior space of the nose cone, wherein the array of apertures comprises a plurality of apertures that are axially spaced from each other along the nose cone;
    providing a frustoconical shaped heat exchanger within the interior space of the nose cone;
    providing a discharge member;
    circulating air through the array of apertures;
    circulating the air through the frustoconical shaped heat exchanger in the interior space; and
    discharging the air out of the discharge member.

15. The method of claim 14, wherein discharging the air comprises discharging the air at a discharge location forward of a fan of the gas turbine engine when the nose cone assembly is mounted to the gas turbine engine.

16. The method of claim 14, wherein discharging the air comprises discharging the air at a discharge location forward of a fan inlet guide vane of the gas turbine engine.

17. The method of claim 14, further comprising circulating oil through the heat exchanger and the discharge member.

18. The method of claim 14, further comprising circulating air through the aperture and the heat exchanger with a pump.

19. The method of claim 18, further comprising driving the pump with a shaft of the gas turbine engine.

* * * * *